No. 858,889. PATENTED JULY 2, 1907.
M. P. MORRISON.
NUT LOCK.
APPLICATION FILED JAN. 7, 1907.
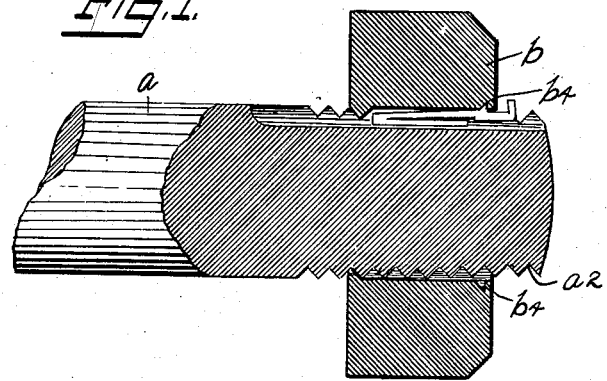
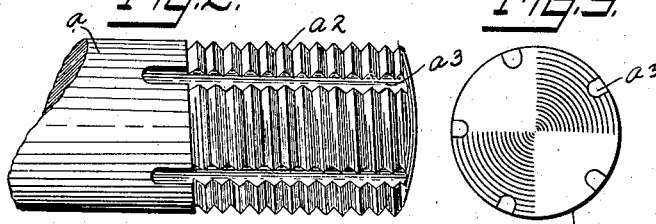
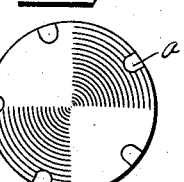
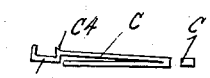
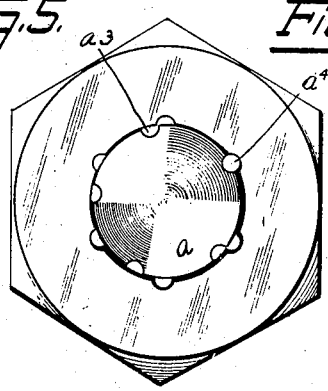
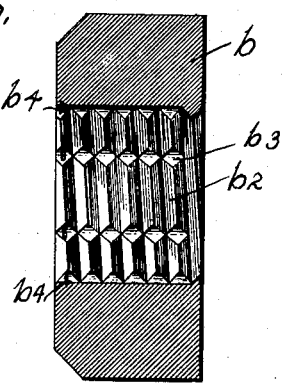
WITNESSES
INVENTOR
Montford P. Morrison
BY
Edgar Tate & Co
ATTORNEYS

UNITED STATES PATENT OFFICE.

MONTFORD P. MORRISON, OF ATLANTA, GEORGIA.

NUT-LOCK

No. 858,889.      Specification of Letters Patent.      Patented July 2, 1907.

Application filed January 7, 1907. Serial No. 351,053.

*To all whom it may concern:*

Be it known that I, MONTFORD P. MORRISON, a citizen of the United States, and residing at Atlanta, in the county of Fulton and State of Georgia, have invented certain new and useful Improvements in Nut-Locks, of which the following is a specification, such as will enable those skilled in the art to which it appertains to make and use the same.

This invention relates to nut locks, and the object thereof is to provide an improved device of this class which may be used in connection with railway rail couplings and fish plates, or in connection with any kind or class of machinery where such devices are required.

The invention is fully disclosed in the following specification, of which the accompanying drawing forms a part, in which the separate parts of my improvement are designated by suitable reference characters in each of the views, and in which;—

Figure 1 is a sectional side view of the end portion of a bolt provided with a nut and showing my improved nut lock; Fig. 2 a side view of the bolt; Fig. 3 an end view thereof; Fig. 4 a side view of a spring lock which I employ; Fig. 5 an end view of a bolt and face view of a nut; and, Fig. 6 a transverse section of the nut.

In the drawing forming part of this specification, I have shown at $a$ an ordinary bolt one end of which is screw-threaded as shown at $a^2$, and in the practice of my invention, I form in the threaded portion of the bolt a plurality of deep longitudinal grooves $a^3$, said grooves, in the form of construction shown, being five in number and being therefor separated by about seventy-two degrees of a circle. I also provide a nut $b$ which is threaded interiorly as shown at $b^2$ to correspond with the thread on the bolt $a$, and the threads $b^2$ of the nut $b$ are provided with deep transverse grooves $b^3$ which correspond with the grooves $a^3$ of the bolt $a$, and which are also arranged in parallel rows which are preferably six in number and equally spaced as clearly shown in the drawing, and by reason of this arrangement of the grooves $a^3$ in the threads of the bolt $a$ and the grooves $b^3$ in the threads of the nut $b$, I provide means whereby a groove in the threads of the nut may be easily made to register with a groove in the threads of the bolt at any time when the nut is fully screwed home, this arrangement and operation being readily understood from the position of the parts shown in Fig. 5.

With five grooves in the bolt and six in the nut as shown in the drawing, one of the grooves in the nut may be made to register with one of the grooves in the bolt thirty times during a single complete rotation of the nut, and it will thus be seen that only a slight turn of the nut is necessary at any time to bring one of the grooves therein into position to register with one of the grooves in the bolt, and this, as will be understood, facilitates the operation of my improved nut lock and renders the same more practical and useful under all conditions, and it will be apparent that the greater number of grooves may be formed in the bolt if desired.

The grooves $b^3$ in the threads of the nut $b$ do not extend through the inner or back thread of the said nut as is clearly shown in Figs. 1 and 6, and in practice, I also provide a spring key $c$ composed of a strip of spring metal folded upon itself to form two separate arms, one of which is longer than the other and provided with a U-shaped head $c^2$. The shape or form of the end of the spring key $c$ opposite the head $c^2$ is shown at $c^3$ and the length of the shorter arm of the spring key $c$ is such that when the arms of said device are forced together, they will lie parallel and flush, and the end of the shorter arm will abut against the U-shaped head $c^2$ and at the end of the longer arm adjacent to the U-shaped head $c^2$ is a projecting prong $c^4$ adapted to enter corresponding recesses $b^4$ formed in the grooves $b^3$ which cut the threads of said nut and adjacent to the outer face of said nut.

In the use of this device, the nut is screwed onto the bolt in the usual manner and is turned so that one of the grooves $b^3$ in the threads of the nut will register with one of the grooves $a^3$ in the threads of the bolt as clearly shown at $a^4$ in Fig. 5. The spring locking device $c$ is then driven into the registering grooves $b^3$ and $a^3$ as shown in Fig. 1, until the prong $c^4$ enters the corresponding recess $b^4$ as is also shown in said figure and the nut will be securely locked in place and cannot be turned in either direction until the spring key is detached or taken out. The object of providing a plurality of the grooves $a^3$ in the threads of the bolt and a plurality of the grooves $b^3$ in the threads of the nut is to provide means whereby at least two of said grooves may be conveniently made to register when the nut is fully screwed onto the bolt, and it will be apparent that any desired number of these grooves in the threads of the nut and bolt may be employed. The nature or form of the threads, the size of the bolt and nut, and the use to which said parts are devoted are all immaterial, and various changes in and modifications of the various features of the construction herein described may be made without departing from the spirit of my invention or sacrificing its advantages, and I reserve the right to make all such alterations therein as fairly come within the scope of the invention.

It will be observed that the grooves $b^3$ in the threads of the nut do not cut or pass through the inner thread of the nut or the thread adjacent to the inner face of the nut, the object of this construction being to limit the extent to which the spring locking key $c$ can be driven into position and the length of the said spring key is such that no care is necessary in driving it into position as the inner thread of the nut will limit its inward movement and the prong $c^4$ is also sprung into the corresponding recess $b^4$ when the spring key is driven into position as shown in Fig. 1.

I am aware that threaded bolts and threaded nuts have heretofore been provided with grooves which cut the threads and in which keys of different forms have been inserted in order to prevent the nut from turning, but the novel features of my invention involving the form, construction and operation of the spring locking key $c$ and the recesses $b^4$ in the nut have never heretofore according to my information been employed.

Having fully described my invention, what I claim as new and desire to secure by Letters Patent, is:—

1. A threaded bolt provided with a correspondingly threaded nut, the threads of the bolt being cut by transverse grooves, and the threads of the nut being also cut by transverse grooves, one of the grooves in the threads of the nut being adapted to be made to register with one of the grooves in the threads of the bolt, and said grooves in the nut being provided near their outer end with recesses, and a folded spring key adapted to be driven into said grooves when in a registering position and one part of which is provided at its outer end with a prong adapted to enter the recess in the corresponding groove in the nut.

2. A threaded bolt, provided with a correspondingly threaded nut, the threads of the bolt being cut by deep transverse grooves, the threads of the nut, except the inner thread, being also cut by deep transverse grooves, one of the grooves in the threads of the nut being adapted to be made to register with one of the grooves in the threads of the bolt, and the grooves in the threads of the nut being provided adjacent to their outer ends with recesses, and a folded spring key adapted to be driven into said grooves when in a registering position and one of the parts of which is provided at its outer end with a prong adapted to enter the corresponding recess in the corresponding groove in the threads of the nut.

3. A threaded bolt provided with a correspondingly threaded nut, the threads of the bolt being cut by deep transverse grooves, the threads of the nut, except the inner thread, being also cut by deep transverse grooves, one of the grooves in the threads of the nut being adapted to be made to register with one of the grooves in the threads of the bolt, and the grooves in the threads of the nut being provided adjacent to the outer face of said nut with recesses, and a folded spring key adapted to be driven into said grooves when in a registering position and provided at its outer end with a prong adapted to enter the corresponding recess in the corresponding groove in the threads of the nut.

4. A threaded bolt provided with a correspondingly threaded nut, the threads of the bolt and nut being cut by transverse grooves, one of the grooves in the threads of the nut being adapted to be made to register with one of the grooves in the threads of the bolt, said grooves in the nut being provided with recesses between the opposite sides of said nut, and a folded spring key adapted to be driven into said grooves when in a registering position and provided with a prong adapted to enter the recess in the corresponding groove in the nut.

In testimony that I claim the foregoing as my invention I have signed my name in presence of the subscribing witnesses this 5th day of January 1907.

MONTFORD P. MORRISON.

Witnesses:
ALBERT W. GIBBS,
C. E. MULREANY.